United States Patent [19]

Palik

[11] Patent Number: 4,949,528

[45] Date of Patent: Aug. 21, 1990

[54] METHOD AND MEANS FOR RECLAMATION AND RECYCLING

[76] Inventor: Robert A. Palik, R.D. 5-Apple St., Bethlehem, Pa. 18015

[21] Appl. No.: 299,138

[22] Filed: Jan. 23, 1989

[51] Int. Cl.⁵ .............................................. B65B 27/08
[52] U.S. Cl. ........................................ 53/429; 53/116; 53/168; 53/390; 53/473; 209/547; 209/930; 493/204
[58] Field of Search ................... 209/547, 546, 930; 383/37, 32; 206/459, 554; 493/204; 53/473, 429, 120, 116, 168, 140, 390

[56] References Cited

U.S. PATENT DOCUMENTS

| | | | |
|---|---|---|---|
| 3,595,389 | 7/1971 | Morgan et al. | 209/930 X |
| 4,473,373 | 9/1984 | Weiss | 383/102 X |
| 4,667,291 | 5/1987 | Weitzman et al. | 209/930 X |
| 4,670,083 | 6/1987 | Membrino | 493/204 X |
| 4,750,639 | 6/1988 | Schaerer | 383/38 X |
| 4,758,214 | 7/1988 | DeBin | 493/204 |

OTHER PUBLICATIONS

Curbside Recycling Containers (Rehrig Pacific Company).
An Introduction to Waste Mangement, Inc. (Waste Management, Inc.).

Primary Examiner—James F. Coan
Attorney, Agent, or Firm—O'Keefe & Wilkinson

[57] ABSTRACT

A recycling bag assembly is formed from a series of plastic bags similar to trash or garbage bags temporarily secured together by heat tacking or otherwise. The individual bags are usually color coded to facilitate identification of the solid waste material that is to be collected in them for collection and transport to a disposal facility. A method of widespread regular controlled distribution of the bag assemblies is also provided by inserting or otherwise combining the bag assemblies with newspapers prior to delivery of such papers and subsequent delivery of the bag assemblies with such papers.

23 Claims, 7 Drawing Sheets

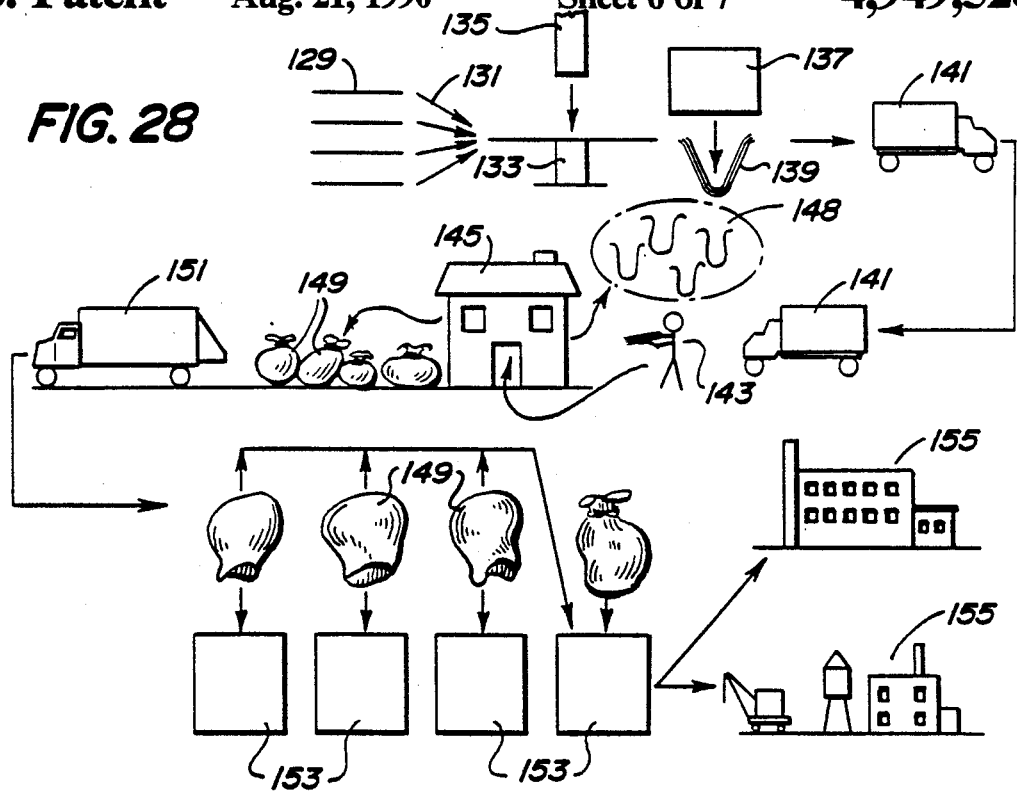
FIG. 28
FIG. 29a  FIG. 29b  FIG. 29c  FIG. 29d  FIG. 29e
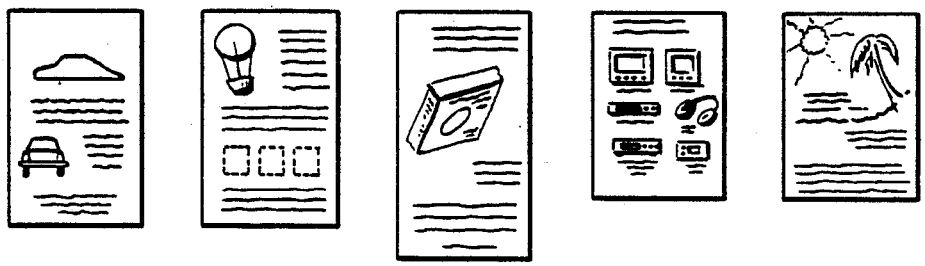
FIG. 30a  FIG. 30b  FIG. 30c
 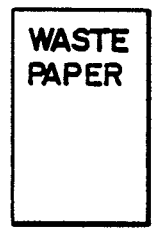 
FIG. 31
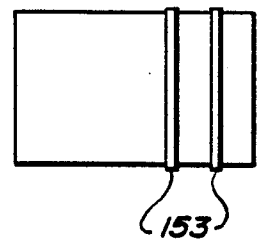

METHOD AND MEANS FOR RECLAMATION AND RECYCLING

BACKGROUND OF THE INVENTION

1. Field of the Invention.

This invention relates generally to recycling and more particularly to the reclamation or recovery of reusable or reprocessible materials from a municipal waste-stream. More particularly still the invention relates to the removal and separate recovery of solid waste materials and particularly postconsumer waste materials such as packaging and the like from residential and commercial waste streams by the provision of specialized containment and delivery means.

2. Description of the Prior Art.

With increasing population and burgeoning production of consumer and commercial products, pollution and overburdening of the environment are rapidly becoming one of the prime problems, if not the prime problem, of latter day industrial society. Modern industrial society seriously threatens to pollute its own living space to such an extent as to almost literally drown itself in a sea of waste. While toxic and unsanitary waste products are perhaps the most serious portions of such wastes, the most visible portion, and in some respects, one of the most difficult and expensive portions to dispose of, is the ever-increasing percentage of solid waste material received at solid waste disposal sites such as land fills, incinerators and the like.

Even after incineration of modern wastes, where such is possible, the residue from incineration has to be disposed of in some manner. Furthermore, some solid wastes such as, for example, plastics and the like, which are non-toxic, but voluminous and essentially nondegradable in their original solid state, may evolve toxic fumes during-incineration. At best, such incineration increases the burden of gases in the atmosphere such as carbon monoxide, nitrous oxides and other gases that may detrimentally increase heat retention in the atmosphere, i.e. the so-called "greenhouse effect". Uncontrolled increases in the daily volume of solid wastes received at disposal sites of limited capacity plus the unavailability of further disposal sites close to centers of population and the resistance of residential populations to having solid waste disposal sites, more commonly referred to as "dumps," in close proximity to their residences, has caused the disposal of such solid wastes and wastes in general to become progressively more onerous and difficult, not to say expensive. Some municipal waste is already being trucked for tens and even hundreds of miles and lack of adequate disposal is agreed by all concerned to be rapidly approaching crisis proportions.

The problem, and indeed crisis, in solid waste disposal is particularly acute in advanced Western industrial nations such as the United States and Canada where the packaging and advertising arts have reached the highest level. Almost all packaging such as wrappings, containers, both for liquids and solids, cushioning materials in packages for fragile articles and other like packaging are either immediately or eventually discarded into the general solid waste stream. Furthermore, with the decreased use of cellulose materials such as paper bags and cartons due to increasing cost and substitution of the frequently cheaper and almost invariably stronger and more attractive petrochemical derived plastic resin substitutes, the materials transported to waste disposal facilities have become more durable and voluminous on a long term basis accentuating already serious disposal problems. The trend to throwaway liquid packaging which is attractive to the consumer because cheap and trouble-free has also added to the ever-increasing bulk of solid waste that must be disposed of.

Various solutions to the mounting solid waste problem have been proposed. For example, there have been proposals to require returnable bottles for beverages. However, the very cheapness of the packages or containers which makes them attractive for packaging frequently renders them insufficiently valuable to be economically worthwhile to clean for reuse or to provide an economic incentive for collection of the old containers versus purchase of new containers. While volunteer organizations have attempted to collect such materials for reuse and recycling, volunteer efforts in the absence of economic incentive have proved an inefficient solution at best and at worst, a mere palliative that masks the seriousness of the problem.

Only in the case of isolated materials or packaging such as, for example, aluminum cans, has reclamation on an economic basis been at least a qualified success. One such special circumstance, in the case of aluminum cans, is the high energy input necessary to refine the metal from the original natural ores, i.e. in the case of aluminum, from bauxite ore, compared to the significantly reduced cost of remelting already used or scrap aluminum and reforming the resulting metal solidified from the melt into new containers. The result of this special thermodynamics of recovery is that it becomes economically worthwhile to provide an economic incentive for individual collection of aluminum containers or cans and reprocessing of such aluminum containers rather than providing new aluminum direct from aluminum ore for manufacture of the cans. The substantially unitary composition of aluminum containers is also an aid in such endeavors, since the remelted aluminum metal obtained from, for example, cans, is substantially the same as that obtained by smelting new ore.

The situation with respect to other solid waste materials such as, for example, so-called tin cans, i.e. steel coated with a tin alloy composition to provide corrosion resistance, is, on the other hand, much less favorable. This is because the heat input necessary to remelt the steel is not a great deal less than that originally necessary to win iron from its original ore and the composite nature of the container structure also causes the remelted material to have a different and inferior composition. Consequently, a further treatment step is necessary to remove the coating material prior to remelting the base steel. The result is that it is cheaper to make new tin cans from newly refined iron ore than to remelt the tin cans, even discounting any cost in collecting the individual cans. The further result is that up to the present time it has not been economically feasible to collect tin cans and all attempts to do so have been pursued purely on a voluntary public benefactor basis. However, if a sufficient volume of cans were available through a large scale collection effort or system, it is possible an efficient stripping of the tin coating could be developed based upon the value of the coating metal itself, whereupon the basic steel could be melted as scrap with no, or at least a minimal, economic detriment. Fortunately, steel or "tin" cans are degradable through rusting to their original constituents as found in iron ore and are not, therefore, as serious a solid waste problem per se as are some of the newer materials such as aluminum and plastics.

The information explosion has also played a large part in the current serious solid waste problem. In particular, the advertising associated with modern industrial society, which advertising is required to encourage competition among numerous suppliers plus continuous consumption and purchase by their consumers or customers, results in itself in a burgeoning of paper products devoted to advertising, not only in newspapers and magazines, but in pure or specialized advertising literature such as the rapidly growing direct mail advertising, sometimes referred to derogatively as "junk mail". Ever increasing percentages of newspaper and other printed news sources are devoted to advertising, both within the pages of the news sheets themselves, and as inserts within such news sheets. Insertion of advertising and special sections into newspapers, often referred to as "stuffing," is one of the fastest growing businesses along with direct mail advertising. This, together with the information explosion itself has created an ever-increasing torrent of printed material of temporary interest only that is quickly thrown away, ending up, in most cases, in solid waste disposal sites.

In the fairly recent past, much of the discarded printed material and particularly newsprint, was collected and recycled into other types of paper goods such as wrapping paper and carton stock. However, with the decrease in the price of resin and plastic materials concomitant with recent increases in petroleum stocks from which resin and plastic materials are made, the market for such secondary or recycled paper products has decreased. In many areas, therefore, it is no longer economically attractive for even volunteer organizations to sponsor collection of waste paper material for recycling. Consequently, most, if not all of such material has been reaching solid waste disposal sites mixed with other solid waste disposables.

More recently, with the recognition by government bodies of the serious solid waste disposal problems, there has been general recognition that something must be done to alleviate the situation. Legislation has consequently been offered or passed for mandatory recycling of certain established types of solid disposables such as glass, plastic, paper, metal of various types and other materials that would otherwise be disposed of at solid waste disposal sites. Such materials can be separated from the normal waste stream either at the source, i.e. in the home or commercial establishment, or at a central collection point or even at a waste disposal site if proper equipment is made available. With full utilization of such recycling it is estimated that from twenty-five to thirty percent or more of the solid waste stream in the usual community can be diverted and recycled back into the industrial stream as used material. For example, clear glass containers and other clear glass articles can be removed from the waste stream and recycled back to use in new containers such as bottles and the like. Plastic articles can, by and large, be separated from other materials if made from thermoplastic materials and remelted together to form low or cheaper grade plastic materials of unspecified or variable composition suitable for various uses such as trash, garbage or leaf bags and the like. Furthermore, these lower grade plastic articles can be continuously recycled back into the same products once the cycle is begun.

While governmental promulgation of recycling procedures and the like can provide an impetus to promote recycling that is not otherwise economically viable, serious problems remain. For example, most legislation has mandated the use of special receptacles and the like for recyclable materials which are then deposited into such special receptacles at the source and collected already separated. Such procedures, sometimes referred to as source separation, while simple and direct, have the serious disadvantage that the consumer has to make the initial separation. Carelessness and inattention can cause misallocation to the incorrect containers and the necessity for the residential customer to purchase proper receptacles as well as monitor their use, tends not to engender good will or cooperation of the ultimate consumer or care in separation of the recyclable materials. Furthermore, it is frequently desirable for the collection personnel to know what is in each container without having to remove the top or otherwise open such container.

It has, heretofore, been known to require separate containers such as trash cans and the like for different types of solid waste material. This has its limits, since it is obviously impractical to require, for example, each residential source of materials to have more than several separate trash receivers in the form of trash cans. Even these trash receivers then must be opened by the trash collector to identify the type of disposal and must be dumped into separate identifiable receivers by the collection personnel, seriously delaying and complicating the collection process.

Trash bags have also been used to receive various types of solid waste. These, however, must then be opened prior to being assigned to one type or other of collectibles at the waste depot or waste disposal cite. Such opening and assignment in itself is time-consuming and fraught with possible opportunities for mistake. Mistake can also easily occur at the primary separation site such as a home or commercial site unless receptacles are clearly labeled. Labeling, however, both at home and for collection personnel, is difficult. In addition, the expense to the user or other point of use operator of providing receptacles or other collection means is likely to significantly decrease their cooperation in the recycling effort through either overt or unconscious resentment. It is clearly, therefore, desirable to make any recycling system or effort as inexpensive to the ultimate user as possible by decreasing or eliminating, if possible, any expenses of such system either by way of direct charges or indirect charges such as imposed by taxation for the system upon the ultimate users.

Prior efforts have been made to effect collection of materials for recycling or reuse in containers or bags made distinctive by color coding. For example, in U.S. Pat. No. 4,473,373 issued Sept. 25, 1984 to S.M. Weiss, there is disclosed a method for handling linen in a hospital involving the laundering of bed linens in a hospital in which the linens are color coded and are collected and distributed in color coded net bags to facilitate ready identification and easy, expeditious handling and allocation. The Weiss system, of course, is not a true recycling system, except insofar as the washing of clothes might be considered to be a somewhat related activity. The Weiss system is also not readily applicable to recycling of solid waste materials.

U.S. Pat. No. 4,750,639 issued June 14, 1988 to E.A. Schaerer discloses a presorting arrangement for household garbage involving the use of two or more (usually three) connected together garbage bags secured together to form, for example, a tripartite trash and garbage receptacle held on a form. Each bag may contain identifying markings, including separate color coding, to aid in placing trash of a certain type in each bag comprising the unitary sack. Schaerer also discloses that it was previously known to use various boxes with insertable sacks of different color to collect decomposable and other refuse in a household. Such an arrangement has the disclosed disadvantage of high purchase costs and space allocation.

Furthermore, while the ultimate residential consumer may be aided by color coded containers as disclosed in the Weiss or Schaerer patents, such color coding has little utility for the collection personnel unless substantially all households use the same color coding, which is difficult to achieve short of restrictive government regulation more appropriate to a police state than a democracy, particularly a heavily consumer-oriented democracy.

While, consequently, there have been prior uses of color coded trash receptacles and solid refuse sorting and separate handling before, the prior proposed systems have been subject to certain serious disadvantages.

The present inventor has found that the major disadvantages of prior systems may be effectively obviated by the use of color and otherwise coded plastic bags distributed substantially universally, or at least very widely, to households in a certain area through existing means, at little, if any, cost to such households or the residents thereof.

The present inventor has essentially realized that the problems inherent in obtaining cooperation of the general public in recycling of reclaimable materials and particularly those problems arising from the cost and inconvenience of recycling to the individual can be largely obviated in accordance with the present invention by providing an inexpensive ready source of recycling containers largely in the form of bags easily identified by color coding or other marking for each type of recyclable material, which bag-type containers are substantially automatically, regularly and inexpensively made available to the householder at the source of the waste products at either no or a negligible cost to the householder or other sorter of such reclaimables. Such containers or bags after filling with reclaimable material are readily collectable at curbside in residential and other areas and are themselves easily discarded and recycled after removal of the waste solid material. The regular provision and minimal cost to the ultimate user is attained by supplying the containers as a collection or assembly of bags delivered with the local daily papers. Such delivery may be accomplished either as a blank plastic bag assembly inserted into the papers or more preferably as an advertising bearing plastic bag assembly inserted into the papers. In favorable circumstances a major portion, if not all, of the cost of such containers can often be offset by paid advertising space provided on the surface of the bags. Thus the cheapness and reliability of supply of the container means overcomes, in many, if not most, cases the natural reluctance of the average householder to undertake and maintain serious recycling efforts. Delivery of the recycling container means directly and automatically to the final user or reclaimables separator prevents the development of a situation similar to that in the steel industry where the cost of recycling overcomes any small inherent advantage of using recycled material. In other words, the ease and universality of the distribution and collection system of the invention renders the collection and use of individual solid waste scrap more economical as compared to producing completely new material from whatever original ore or the like is available to produce fresh material. Stated otherwise, the cheapness and convenience of the method of the invention involving the automatic delivery of color coded bag assemblies to individual households together with the convenience and effectiveness of delivery in the form of the bag assembly of the invention largely overcomes the normal reluctance of large numbers of members of the public to take the trouble to cooperate with public recycling efforts. Appropriate laws and ordinances can be taken advantage of to add impetus to the average homeowner's efforts to use the bag assemblies of the invention to separate for collection and recycling several recyclable materials at once. The use of a plurality of containers marked to rationally aid in separating a plurality of materials at one time thus by decreasing the cost of separately recycling any single material renders recycling efforts effective and cost competitive. Furthermore, the substantial universal or widespread use aspects of the system of the invention substantially increase the efficiency of collection of recyclables under the system because of the uniform use of similar color coded containers by most, if not all, of the households in a given area.

OBJECT OF THE INVENTION

It is an object of the present invention, therefore, to provide a method of providing color coded solid waste receptacles to residences and less extensively to commercial establishments by providing a package insert of color coded plastic bags delivered as an insert in a locally delivered paper.

It is a further object of the present invention to provide a method of recycling in which color coded plastic bags are inserted or stuffed into home delivered papers and delivered without charge or at a nominal charge to at least a majority of households in an area, which bags can then be used to sort household solid waste for purposes of recycling certain items.

It is a still further object of this invention to provide a color coded assembly of plastic bags suitable for sorting and separation of solid waste material in which the bags are adhered or folded together in such manner as to be readily inserted into newspapers by existing insertion machinery.

It is a still further object of this invention to provide a color coded package of bags having different characteristics such as thickness and size for sorting and separating, followed by collection, such as curbside collection, of residential, and, to a lesser extent, commercial solid waste materials such as glass, newspaper, plastic, metallics and other materials.

It is a still further object of this invention to provide a method of recycling that is so convenient and cost free for the ultimate sorter that it will be substantially used in whatever manner is mandated by the local authorities.

It is a still further object of this invention to provide a method and means for recycling that can be substantially self-supporting in that the ultimate consumer or user can obtain the required equipment or supplies substantially without cost or at nominal cost.

It is a still further object of the invention to provide a method and means for recycling that will provide incentive and space for advertising to at least partially cover the cost of the apparatus necessary to practice the method.

It is a still further object of this invention to provide an assembly of recycling containers that can be easily and conveniently inserted in newspapers for delivery with such papers.

It is a still further object of this invention to provide an assembly of recycling containers in the form of separately color coded bags that can be inserted into newspapers and will be retained readily in such papers during newspaper delivery operations.

It is a still further object of this invention to provide an assembly of recycling bag-type containers in folded condition suitable for insertion in newspapers.

It is a still further object of this invention to provide an assembly of recycling bag-type containers for distribution to consumers of resources and products for source-separation of recyclable materials.

It is a still further object of this invention to provide a color coded collection of reclamation bags which are delivered periodically to householders as a part of a newspaper package for source separation of reclaimable solid waste materials.

It is a still further object of the invention to provide in a convenient and use-encouraging manner, an assembly of color coded bags that can, after filling, be placed for curbside collection.

SUMMARY OF THE INVENTION

The disadvantages of the prior art have been obviated and the objects of the invention are fulfilled in accordance with the invention by forming a package of a plurality of preferably color coded plastic bags that can be inserted or "stuffed" into locally delivered newspapers and delivered to a large number and preferably a majority of homes in an area.

The bags are separated and used to hold the type of trash for which they are color coded or otherwise marked and are collected easily at curbside or other predetermined locations after being at least partially filled with the type of materials for which color coded or marked. The solid waste recyclable materials are dumped from the bags at a collection or reclamation site or occasionally on the truck or other vehicle used for collection and are subsequently processed for recycling.

The various bags of the bag assemblies of the invention have considerable surface area which, in the normal course of events, will be exposed for significant periods while the bags are being filled with recyclable materials and are therefore available for advertising purposes the revenue from which can go a long way toward decreasing the cost of use of the system of the invention to the ultimate users.

BRIEF DESCRIPTION OF THE DRAWINGS

FIG. 13b shows an end view at right angles to the view of FIG. 13a.

FIG. 14 is an end view of a folded bag assembly made by the apparatus of FIGS. 7 through 11.

FIG. 15 is an end view of a heat-tacked folded bag assembly made in accordance with the procedure shown in FIG. 6.

FIG. 16 is an end view of an alternative clamped version of the bag assembly shown in FIG. 15.

FIG. 28 is a generalized diagrammatic semi-pictorial flow sheet showing the general flow of steps in the practice of recycling in accordance with the present invention and/or, more broadly still, how the recycling method of the present invention fits into an overall recycling program.

FIG. 29 shows five different sized bags designed to be assembled into a five-bag recycling assembly. The five separate bags are denoted as separate FIGS. 29a, through 29e and carry various advertising messages upon their surfaces.

FIG. 30 shows three different sized color coded bags designed for assemblage into a three-bag assemblage in accordance with the present invention. The separate bags are denoted as separate FIGS. 30a through 30c and are verbally coded with the intended contents as shown.

FIG. 31 shows a folded bag assemblage in accordance with the present invention formed from the three bags of FIG. 30 and secured together with plastic ties.

DESCRIPTION OF THE PREFERRED EMBODIMENTS

Figure 1:
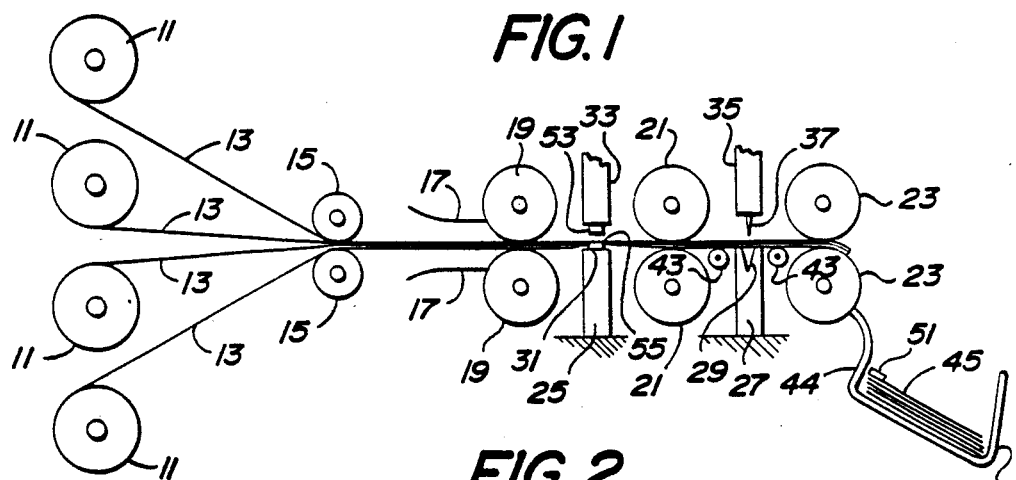
FIG. 1 is a diagrammatic side elevation of a machine arrangement for forming an assemblage of refuse bags secured together at one end by heat welding or tacking.

As has been explained above, the public benefits of recycling include removing or diverting up to, or more than, 25% of the normal bulk of solid wastes from the solid waste stream at an early stage in processing or disposal of such materials, thereby saving not only further handling charges and steps, but decreasing the shear bulk of material that must be dealt with, such as, for example, by committing such waste to finite solid waste disposal facilities, i.e. dumps. Such benefits are, in accordance with the present invention, accomplished by providing assemblies of bags for delivery to residences and the like folded into or inside or otherwise associated with newsprint periodicals such as daily newspapers and the like.

The assemblies of bags are especially arranged and designed for convenient insertion or "stuffing" into newspapers and the like. The method of the invention may be practiced essentially as follows. A plurality of bags which, for example, may be four plastic bags, are first individually removed from supplies of such bags. For example, rolls of plastic bags of various desired weights or thickness are first unwound and one bag from each roll is assembled together with the other bags into a series of bags closely superimposed upon each other. The bags may be assembled together in several manners, of which the preferred arrangement is to heat adhere the bottom portion of the assembled or superimposed bags to heat weld them together. Preferably, in most cases, the bottoms of the bags are heat welded together with the incorporation of a flexible strip of plastic that provides a convenient reinforced portion upon which stuffing machinery may operate, thus providing easy handling by either manual or mechanical stuffers.

The bags themselves are preferably of different colors, or, in other words, are substantially color coded or identified as to the type of material that may be placed in them. The bags may also be made of various materials and weights of plastic. For example, there may be one clear bag having a thickness of 2 mils for the receipt of clear glass scrap. The adjacent bag may be silver or gray for aluminum scrap and the bag adjacent thereto may be white for insertion of newsprint and the last of a four-bag assembly may be brownish-black or greenish for the receipt of plastic scrap. The clear plastic bag will ordinarily have the greatest thickness to withstand penetration by sharp pieces of broken glass. The black or brown plastic bag, which may itself be made from a mixture of recycled plastic, can usually be the thinnest of all the bags, since plastic sheet waste is usually light and not difficult to retain in another bag.

An alternative assembly of bags may comprise a series of four bags more or less wrapped about a stiff section of cardboard or plastic to form a compact package that may be shrink-wrapped in an outer clear plastic. Several rectangular sheets of plastic or cardboard may be prepared as a superimposed assembly that serves initially as a backboard for wrapping the bags themselves together and supporting a fairly stiff package that may be grasped either manually or mechanically and then stuffed between the pages of a daily newspaper or the like. Depending upon their intended contents, the bags of the assembly may desirably, though not necessarily, be from 1.5 mils to 3 mils, or thousandths of an inch, in thickness.

As indicated above, it is usually preferable for the bags in one assembly to be of various thickness and sizes depending upon the contents intended for them. For example, it is desirable that no thicker bag be used than is necessary to adequately contain its intended contents both for reasons of economy and to minimize unnecessary addition to the solid waste stream. Also, since the average household will collect more of certain materials than others in any given time period, it is preferable for economy and efficiency to provide bags during each collection period having a capacity approximately comparable to the relative amount of material to be collected.

The invention will be further illustrated and understood in its various ramifications by review of the appended drawings and diagrams in connection with the following description and further explanation.

Figure 2:
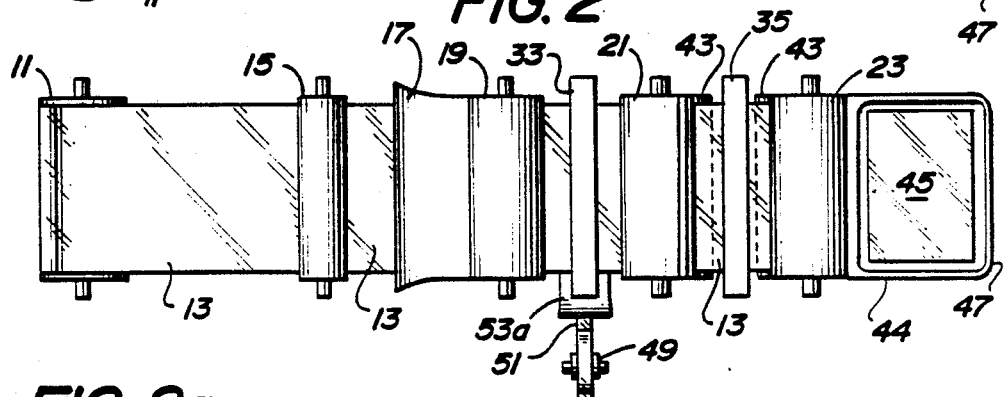
FIG. 2 is a diagrammatic top or plan view of the machine arrangement shown in FIG. 1.

FIGS. 1 and 2 are a diagrammatic elevation and a diagrammatic plan view respectively of an apparatus designed for fabrication of bag assemblies in accordance with and for use in accordance with the present invention. In FIG. 1 reels 11 hold rolls of attached or semi-attached plastic bags which have been made by methods already known from continuous sheets or tubes of plastic. The sheets or tubes of plastic may, but need not, be perforated or otherwise attenuated between adjacent bags as known in the art so that the separate bags may be separated from each other. In FIG. 1, continuous bag material 13 from each roll passes from the reels 11 between guide rolls 15 and between two guards 17 into the bite of driven tension rolls 19. Beyond the driven tension rolls 19 there are a second set of drive rolls or tension rolls 21 and beyond these a third set of such rolls 23. Between the driven tension rolls 19 and 21 is an anvil 25 and between pairs of tension rolls 21 and 23 is an anvil 27. Anvil 27 is cut out or hollowed out in the center to provide an elongated orifice 29. The anvil 25 has a flat surface 31 which may be a heated surface. Above and opposed to anvil 25 is a vertically movable heating die 33. Opposed to the anvil 27 is a cutterhead 35 supplied with a shearing blade 37. The cutterhead 35 and heating die 33 are both vertically movable towards and away from the anvils 27 and 25 respectively. Small conveyor rolls 43 are provided between driven tension rolls 21 and 23 on each side of the anvil 27.

Beyond the driven tension rolls 23, there is provided a collecting bin structure 44 in which bag assemblies 45, i.e. a plurality of bags heat tacked together into at least a temporarily cohesive unit, are collected after fabrication. The collecting bin 44 is preferably as shown, arranged at an angle so that the bag assemblies 45 as they are expelled between the driven tension rolls 23 fall downwardly into the bin and are aligned against a lower end or flange 47 of the bin.

The same structures as shown in FIG. 1 are shown in FIG. 2, which is a diagrammatic plan view of the same apparatus. One additional element is shown in FIG. 2, however. This is a reel 49 containing a roll of reinforcing plastic strips 51 which upon rotation of the reel 49 are passed between upper and lower guides 53a and 53b between the flat surface 29 of the anvil 25 and the heating die 33. The reel 49 and guides 53a and 53b are shown in further detail in FIG. 2a. A cutter blade 53 (see FIG. 1) is attached to the side of the heating die 33 in a position to sever the plastic reinforcing strip 51 when the heating die 33 is lowered. In the case where the plastic bag strips are already perforated for separation, a further apparatus may be substituted for the cutter blade 37. Such other apparatus may take several forms including an additional tension roll positioned over the bin 43, which tension roll or rolls turn at a greater peripheral speed than the tension drive rolls 23 so the individual bags in the bag assembly 45 are separated from the remainder of the rolled bag material. The same effect can be obtained by operating the tension drive rolls 23 at a greater peripheral speed than the tension drive rolls 21.

One very desirable way to make the bag assemblies by the apparatus shown in FIGS. 1 and 2 is to use flattened tubular bag material which has not yet been sealed across its width to form separate bag elements. In this arrangement heat sealing of the ends of the bags may be accomplished at the same time as the bags are heat tacked together. This cannot be accomplished by the same heat die or the same heat die section, however, because a secure sealing is desired at the bottom of the bags, but only a temporary heat adhesion between the separate bags of the bag assembly. An arrangement for accomplishing such differential heating is shown in FIG. 2b where the individual flattened tubular sections are sealed in a split heating die and the bag assemblies are simultaneiously heat tacked together by an adjoining die or die sections. In FIG. 2b heat die 33 serves to heat tack the bag sections together while an adjacent sealing die arrangement 50 comprising an upper heat die 52, a lower anvil 54 and three intermediate guide dies 56 each comprising a central heating section 57 and a pair of roller guides 59 at each end serves to separately seal the ends of the separate bags together.

Figure 2A:
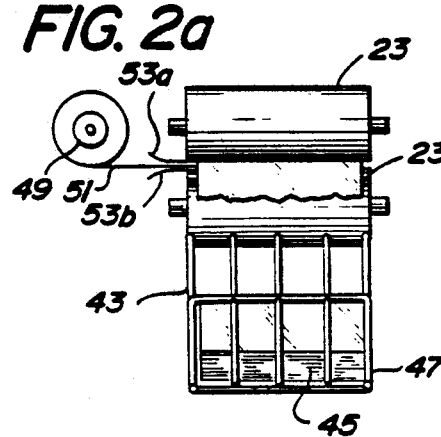
FIG. 2a is a diagrammatic end view of the machine arrangement of FIGS. 1 and 2.
Figure 2B:
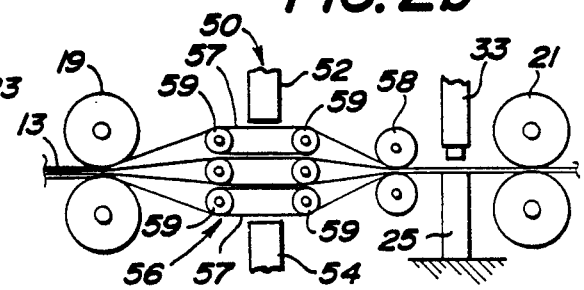
FIG. 2b is a diagrammatic side elevation of a portion of the apparatus shown in FIG. 1 with the inclusion of a modification enabling individual bag sealing to be accomplished along with bag tacking into the bag assemblies of the invention.

The operation of the apparatus shown in FIGS. 1, 2 and 2a is as follows. At the beginning of operation, strips of plastic bag material 13 are partially unreeled from the reels 11, passed through the guide rolls 15 and entered between the driven tension rolls 19. Preferably the plastic bag strip material is passed through the tension rolls 19 and entered into the driven tension rolls 21 as well. The apparatus is then ready to operate in the power mode. By turning or driving the tension rolls 19 and 21, additional plastic bag strip material will be removed from the reels 11 as desired. When strip material extends between all the driven tension reels 19, 21 and 23, the apparatus is stopped and the heating die 33 is activated. The cutterhead 35 moves downwardly so that the shearing blade 37 severs the four bag strips at a single stroke into coequal length bags. Just prior to this, the reel 49 will be operated to pass a reinforced plastic strip over the bag strip material so that the plastic strip 51 is against the top of the strip bag material when the heating die 33 descends. While the heating die 33 is in contact with the reinforcing plastic strip material 51 and with the strips of bag material 13, both the end of the die 33 and the upper flat surface 31 of the anvil 25 are heated so that the plastic materials are tacked together. Since it is desired that the tacking not be sufficient to permanently secure the pieces together, but only to maintain them together during handling, not too much heat is applied. At the same time that the heating die 33 moves down, the cutting blade 53 mounted on the end of the heating die 33 descends and passes sufficiently close to a lower cutting or shearing member 55 mounted upon the anvil 25 to initiate a shearing action which effectively severs the reinforcing plastic strip 51 into a length approximately equal to the width of the plastic bag material 13. The length of the severed plastic strip 51 will preferably be coequal with the width of the widest strip of plastic bag material which is being used. As mentioned earlier, different widths of bags may be used in order to vary the capacity of such bags and prevent wastage of the plastic material.

After the heat die 33 has descended upon the anvil 25 heat tacking the one end of the four bags together along with the plastic reinforcing strip 51 the movement in line of the bag assembly is continued. After the tacked portion of the bag assembly 45 has passed through the driven tension rolls 21 it is severed just behind the tacked portion as it leaves the tension rolls 21, whereupon the severed bag assembly 45 is passed through the driven tension rolls 23 into the collecting bin structure 43. A new bag portion has already passed through driven tension rolls 21 in the meantime and is supported on small guide rollers 43 until it enters into the driven guide rolls 23 after which the cycle is repeated to produce additional bag assemblies by repeating the cycle.

As indicated above, the apparatus in FIG. 2b provides a contiguous bag sealing assembly and heat tacking die arrangement. As shown diagrammatically in FIG. 2b, a heat die 33 and opposed anvil 25 are provided substantially the same as in FIG. 1. These two elements are used to heat tack the individual bags together into a bag assembly. A second assembly comprises a heat die 50 that serves to heat seal each tubular bag section at the bottom. The heat die 50 is comprised of an upper heat die 52 vertically movable toward the lower anvil 54 which is also heated. Between the upper heat die 52 and the anvil 54 are three guide dies 56, each comprised of a central heating die section 57 and a pair of roller guides 59 journaled at each end of the central heating die section. The three guide dies are supported between the four bag strips 13 by any suitable side supports, not shown, and are preferably spring biased away from each other by any suitable resilient means, not shown, when not in a heating mode. The plastic bag strips 13 are individually passed between the various heating die sections so that the outer two bag strips pass between the heating die 52 and the adjacent guide die 56 in the case of the upper strip and between the anvil 54 and the adjacent guide die 56 in the case of the lower bag strip, while the two central bag strips pass between adjacent guide dies 56. When the four bag strips are to be sealed into individual bags, the upper heating die 52 is moved downwardly against the upper bag strip which is driven against the adjacent guide die and so on until all the strips are clamped between separate heating dies and may be separately heated and sealed. At the same time the two guide rolls 58 direct the bag strips 13 between the heating die 33 and anvil 25 where the separate bags are lightly heat tacked together into a bag assembly as shown in FIGS. 1 and 2 and then severed into separate assemblies as shown in FIG. 1 and 2 by the cutter head 35. As will be recognized, this method of forming bag assemblies has the advantages of flexibility and convenience in that the lengths of the bag assemblies may be readily varied and less coordination of the parts of the machinery and operations is necessary since the location of the divisions between the bag sections does not have to be kept track of except during the final severing operation. The resulting bag assembly is heat-tacked, as in most of the embodiments of the invention, near the bottom.

The bag assemblies 45 made in the apparatus shown in FIGS. 1 through 2A are fairly large so that they will accommodate a reasonable amount of solid waste and particularly post-consumer type solids waste such as, for example, aluminum cans, glass containers, steel and bi-metallic cans, paper products, newsprint, plastics, leaf waste and other similar solid waste which would otherwise be disposed or processed as municipal waste. Therefore, since newspapers, when delivered, are folded into a fairly compact flat package, it will be recognized that before the bag assemblies formed in the apparatus of FIGS. 1 and 2 et al. can be inserted or stuffed into newspapers such bag assemblies must inevitably be folded to reduce their effective packaging dimensions. FIGS. 3 through 6 are diagrammatic side elevations of an apparatus designed for folding the bag assemblies of the invention into a compact bundle which may be conveniently inserted or stuffed into newspapers.

Figure 3:
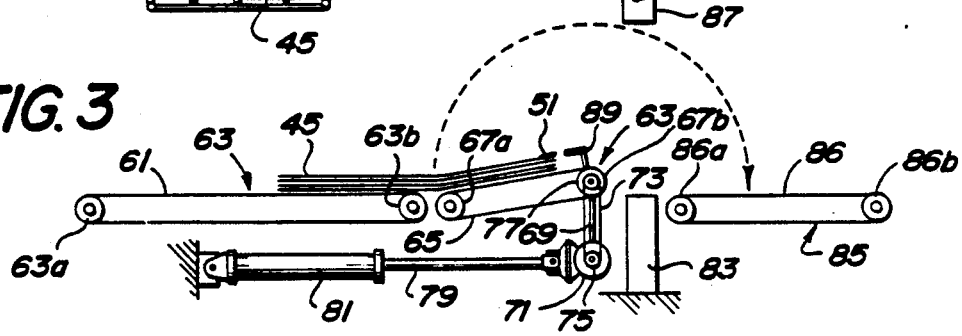
FIG. 3 is a diagrammatic side elevation of a device for folding on itself the bag assembly made in the apparatus of FIGS. 1 and 2.

In FIG. 3 there is shown diagrammatically a conveyor section 61 comprised of any suitable belt-type conveyor structure 63 supported by or about rotatable roller supports 63a and 63b. A second belt-type conveyor 65 is also comprised of a conveyor belt 67 journaled over support rollers 67a and 67b. The belt-type conveyor 65 is supported by an upwardly extending arm 69 to which the rotatable roller 67b at one end of the belt-type conveyor 65 is rotatably journaled in any suitable manner. The lower end of arm 69 is supported by a motor and gearbox combination designated collectively as 71, which is connected by any suitable link type flexible connecting means 73, for example a sprocket chain or belt, which extends between a sprocket 75 on the motor and gearbox combination 71 to a companion sprocket 77 upon the end of the structural portion of the belt-type conveyor 65. A piston rod 79 is connected to the upwardly extending support arm 69 via the structural portions of the motor and gearbox combination 71. The piston rod 79 is operatively connected to a piston, not shown, within the cylinder 81. Piston rod 79 is shown extended in FIG. 3 so that the upwardly extending support arm 69 is positioned close to an anvil 83. A third belt-type conveyor 85 is positioned just beyond the anvil 83. This is comprised of conveyor belt 86 journaled over support rollers 86a and 86b. A stop or retaining catch 89 is shown extending upwardly from the vicinity of the roller conveyor 67B in FIG. 3. Also shown in FIG. 3 is a bag assembly 45 such as has already been made in the apparatus shown in FIGS. 1 and 2. The bag assembly 45 is shown in its preferable position with the reinforcing strip 51 at the end adjacent the retaining catch 89.

Figure 4:
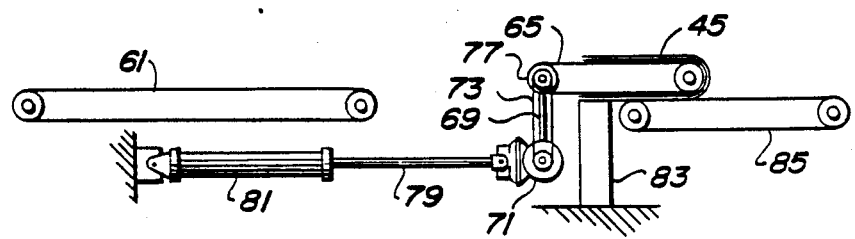
FIG. 4 is a diagrammatic side elevation similar to FIG. 3 showing the next stage of the folding operation.
Figure 5:
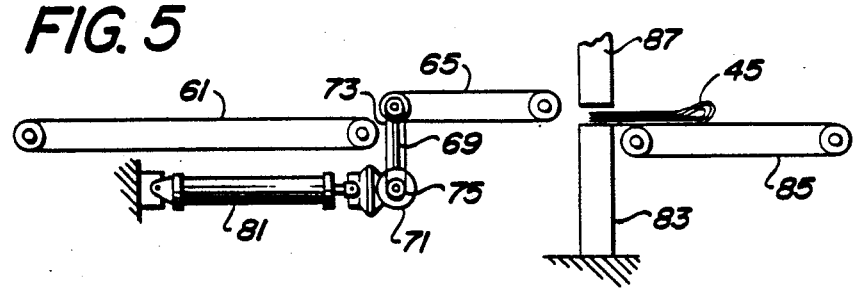
FIG. 5 is a diagrammatic side elevation similar to FIGS. 3 and 4 showing the next operation in the folding cycle.
Figure 6:
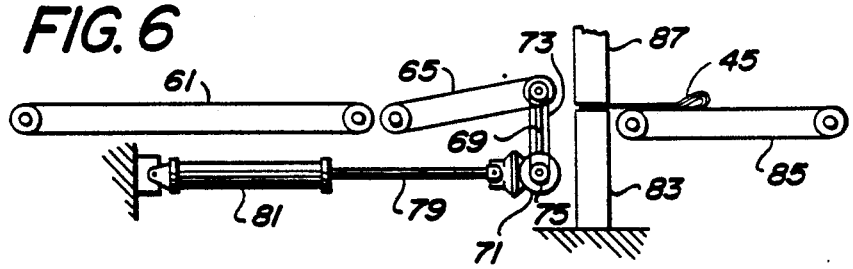
FIG. 6 is a diagrammatic side elevation similar to FIGS. 3 through 5 showing the last operation of heat tacking the ends of the folded bag assembly to prevent premature unfolding.

FIGS. 4 through 6 diagrammatically show subsequent stages of operation of the folding apparatus shown in FIG. 3. Following such stages through, it will be noted in FIG. 3 that the bag assembly 45 is resting both upon the conveyor 61 and the conveyor 65 with the reinforced section of the bag assembly 45 closely adjacent to the stop or retaining catch 89. It will be understood that the bag assembly has been brought previously to the position shown by operation of the conveyors 61 and 65.

FIG. 4 shows the apparatus of FIG. 3 after operation of the motor and gearbox 71 which by activating the sprocket chain connecting means 73 rotates or pivots the entire conveyor 65 which is fixedly connected to the sprocket 77. As the sprocket 77 is rotated, the conveyor 65 is rotated 180° to a new orientation. In doing so, the conveyor belt 65 is rotated up under the center of the bag assembly 45, effectively lifting the bag assembly center and flipping the entire bag assembly over so that the original end which was held by the stop or retaining catch 89 ends up underneath the conveyor, while the opposite end of the bag assembly, which was originally on conveyor 61, ends up on the top of the conveyor 65. At this point the piston in cylinder 81 may retract piston rod 79 which displaces the vertically extending support arm 69 to the left. Such movement to the left as viewed in the figures effectively withdraws the belt conveyor 65 from the interior of the folded over bag assembly 45. See FIG. 5. Once the conveyor 65 clears the bag assembly 45 and the adjacent anvil 83 and heating die 87, the motor and gearbox 71 may rotate sprocket 77 in the opposite direction causing conveyor 65 to be rotated in an arc back to its original position as shown in FIGS. 3. As the conveyor belt is being in effect flipped back to its original position, the cylinder 81 may be displacing the piston rod 79 again to the right until the disposition and orientation of the various parts is exactly as shown in FIG. 3. At this point, or alternatively earlier, while the conveyor 65 is rotating back to its original position, the heating die 87 will be displaced downwardly and at the same time heated by suitable internal heating means so that when the two upper ends of the bag assembly 45 are compressed between the surface of the anvil 83 and heating die 87 the two opposed ends of the bag assembly 45 are lightly tacked together to keep them from separating during handling. See FIG. 6. It will be understood that such light tacking should not be sufficient to cause any inconvenience to the ultimate consumer in opening the bag assembly to extract the color coded bags for collection of solid waste or trash.

Figure 7:
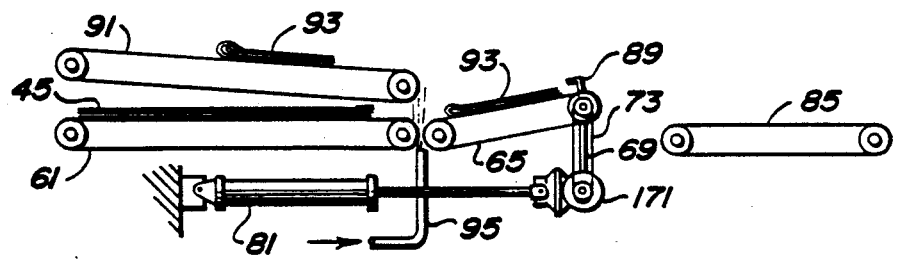
FIG. 7 is a diagrammatic side elevation of an apparatus for folding a paper insert such as an advertising section of a paper, or paper stuffers, inside a bag assembly in accordance with the invention.
Figure 8:
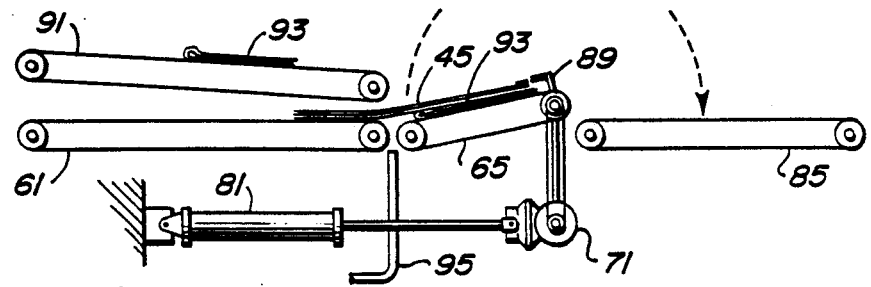
FIG. 8 is a diagrammatic side elevation similar to FIG. 7 showing the next stage in the folding operation begun in FIG. 7.

FIGS. 7 through 11 show an apparatus similar to the apparatus shown in FIGS. 3 through 6 with the further addition of an upper conveyor belt 91 upon which already folded advertising or stuffing sections for insertion in a newspaper are carried to the apparatus. As shown in FIG. 7, an advertising insert 93 has just been deposited upon the conveyor 91. Upon operation of the conveyor 91, the advertising circular 93 is propelled or moved onto the conveyor 65. The conveyor 61 subsequent thereto will then convey a bag assembly 45 up onto the conveyor 65 over the advertising insert 93 so that both lie within the stop or retaining catch 89 at the end. See FIG. 8. An air pipe 95 mounted between the conveyors 61 and 65 serves to lift the bag assembly 45 as it passes from conveyor 61 to conveyor 65 in order to lift the bag assembly gently over the top of the advertising insert 93 and prevent any chance of the bag assembly 45 becoming entangled with the end of the advertising insert 93 rather than passing up over it.

Figure 9:
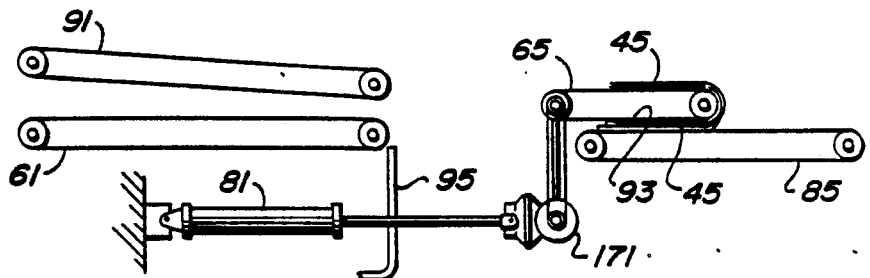
FIG. 9 is a diagrammatic side elevation similar to FIGS. 7 and 8 showing the next stage in the folding operation.
Figure 10:
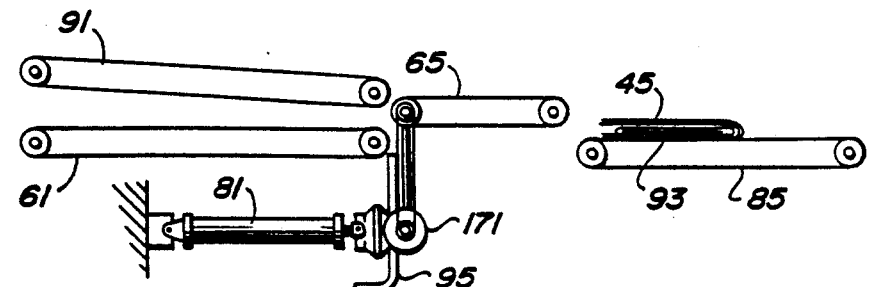
FIG. 10 is a diagrammatic side elevation similar to FIG. 9 showing the next stage in return of the apparatus to the original configuration shown in FIG. 7.
Figure 11:
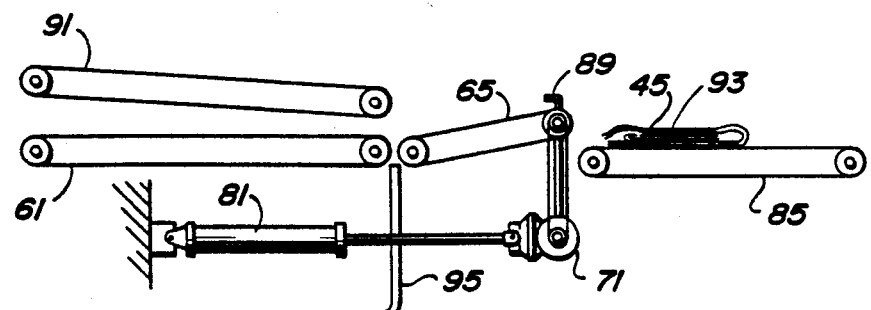
FIG. 11, is a diagrammatic side elevation similar to FIGS. 7 through 10 showing the end of the folding cycle with the apparatus returned to the same orientation as in FIG. 7.
Figure 12A:
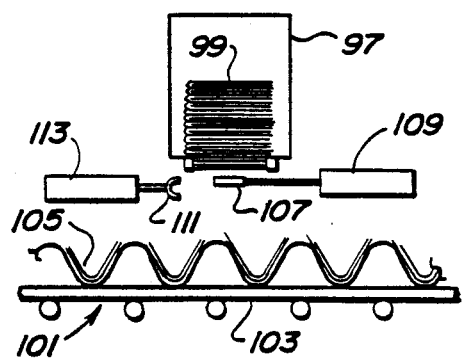
FIGS. 12a and 12b are diagrammatic side elevations of an inserter or stuffer for inserting either the folded tacked bag assembly formed in the apparatus shown in FIGS. 3 to 6 or the folded bag assembly-newsprint advertiser combination formed in FIGS. 7 through 11. The stuffer is shown in two successive stages of operation in the two figures.
Figure 12B:
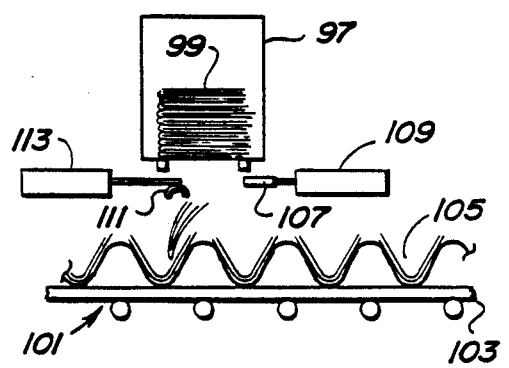

Once the bag assembly 45 is resting upon the advertising insert 93 on the conveyor 65, the motor and gearbox assembly 71 may operate to displace the conveyor 65 approximately 180° so the front end of the bag assembly will end up on the bottom of the advertising insert 93 as shown in FIG. 9 and the other end of the bag assembly 45 will come to rest upon the upper surface of the advertising insert 93, also as shown in FIG. 9. FIG. 10 is similar to FIG. 5 and shows the conveyor 65 being withdrawn from between the advertising insert 93 and one side of the bag assembly 45. Likewise, FIG. 11 is similar to FIG. 6 and shows the apparatus returned to its original position whereupon the conveyor belt 85 may be operated to remove the folded together advertising insert and bag assembly 45/93 to a subsequent operation, FIGS. 12a and 12b show two stages of inserting either the bag assembly, folded over as disclosed in FIGS. 3 through 6 or folded about an advertising insert as disclosed in FIG. 7 to 11, into the main portion of a newspaper. In FIG. 12a a hopper assembly 97 carries a stack of prefolded bag assembles indicated in the folded configuration by the reference numeral 99. The hopper assembly 97 is, as generally known in the art, a fairly open arrangement into which additional stacked folded bag assemblies may be easily placed as necessary. A conveyor arrangement 101 is provided under the hopper assembly 97. The conveyor arrangement 101 comprises an endless conveyor 103 upon which are positioned open racks 105 into the open tops of which may be inserted regular daily newspaper sections in open position ready for insertion from the top of various advertising literature and the like in an operation known generally as "stuffing". As known in the art, a suction head 107 is used to initially adhere to the bottom of the advertising inserts and folded bag assemblies 99 contained in the hopper assembly 97 and to start withdrawal of such folded bag assemblies prior to operation of the cylinder 109 which cylinder serves as a motor device for moving the suction head 107. A gripper head or peeling off head 111, which is also mounted in conjunction with a pneumatic or hydraulic cylinder 113, serves to mechanically peel the folded bag assemblies downwardly after they are loosened by the suction device 107 and directs the folded bag assemblies 99 into the open racks 105 upon the endless conveyor 103. This is more particularly illustrated in FIG. 12b. It will be understood that the illustration of the stuffing mechanism in FIG. 12a and 12b is diagrammatically illustrative only of the different commercial inserters or stuffers that can be used. For example, various stuffers made by Harris Graphics, of Champlain, N.Y., a division of AM International, will be found to be very satisfactory for use for inserting the folded bag assemblies of the invention into daily newspapers. It is important naturally, that the bag assembly of the invention be adaptable for insertion or stuffing into newspapers by various suitable inserters or stuffing machines which will be familiar to those knowledgable in the stuffing art.

Figure 13A:
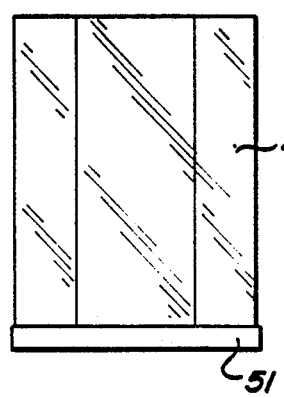
FIG. 13a is a view of the flat side of the bag assembly formed in the apparatus shown in FIGS. 1 and 2.
Figures 13B, 14, 15, 16:
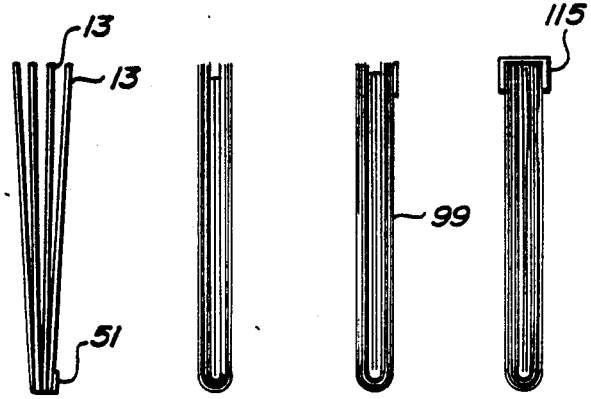

FIG. 13a shows a side view of the bag assembly which may be made in the apparatus of FIGS. 1 and 2. The creases in the side of the top bag indicate where the bag itself may be folded to create a more compact bag for incorporation into the assembly. A plastic reinforcing strip 51 can be seen adhered to the bottom of the bag assembly adjacent to the top bag. FIG. 13b shows a side view of the bag assembly shown in FIG. 13a. It will be seen in FIG. 13b that all the bags of the bag assembly are the same length. They could, however, be of different transverse dimensions, but this possible variation is not visible in the FIGS. 13a or 13b as drawn.

FIG. 14 shows a newspaper with a folded bag assembly inserted into its center by the apparatus shown in FIGS. 12a and 12b.

FIG. 15, on the other hand, shows a side view of a folded bag assembly 99 made in accordance with the apparatus shown in FIGS. 7 through 11. FIG. 16 shows an alternative version of the folded bag assembly in which the two folded over ends are clipped by a plastic clip 115 to keep them under control while inserting into newspapers.

Figure 17:
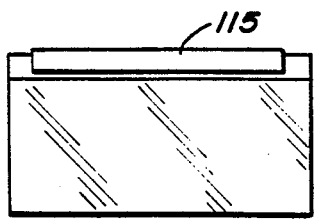
FIG. 17 is a side view of the clamped bag assembly arrangement shown in FIG. 16.

FIG. 17 shows a side view of the bag assembly shown in FIG. 16. It can be seen in FIG. 17 that the plastic clip 115 extends subsantially along almost the entire top surface of the bag assembly.

Figure 18A:
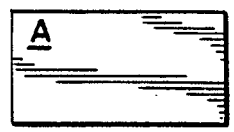
FIGS. 18a, 18b and 18c show the three component parts of an alternative version of a folded bag assembly including a central wrapping form A, a multipartite bag assembly B, and a shrink wrap outer cover C.
Figure 18B:
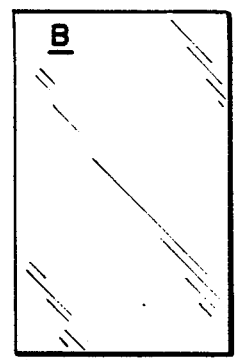
Figure 18C:

FIGS. 18a, 18b and 18c show side elevations of the various parts of an alternative bag assembly which may be made by hand or by use of any suitable apparatus, not shown. FIG. 18a shows a cardboard backing A upon which a plurality of bags may be folded. FIG. 18b shows one of a series of bags designated B which can be folded about the cardboard insert (A). FIG. 18c shows a polyethylene shrink wrap type outer coating C which may be provided as an outer wrapping or tie upon the bag assembly.

Figure 19:
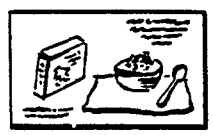
FIG. 19 shows a form of the central wrapping form A of FIG. 18a including advertising copy on the surface.

FIG. 19 shows a very desirable cardboard or other thin material insert such as A, shown in FIG. 18a, upon which advertising material is diagrammatically illustrated. It will be understood that the insert forms a very desirable surface for the provision of advertising to the ultimate consumer. Depending upon dimensions, the cardboard inserts may also do double duty not only as a backing for folding the bag assembly upon, but can also be formed from various thicknesses of separate sheets which can be separately inserted into the solid waste bags as bottom reinforcing for the bags during use. As indicated above, the surface area of the bags themselves can also be used for advertising material. In this regard, see also FIGS. 29a through 29e.

Figure 20:
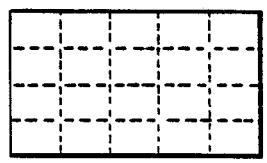
FIG. 20 shows a form of the central wrapping form A of FIG. 18a including separate perforated coupons serving as a whole in their unseparated state as the form A.

FIG. 20 shows a still further alternative of the cardboard or thin insert shown as A in FIG. 18. In FIG. 20, such insert A is in the nature of a collection of perforated coupons 98 which may be separated from each other at the perforations 100 shown in the figure, but which insert A serves as a unitary bag folding medium for the individual bags prior to separation to form the bag assembly of the invention.

Figure 21:
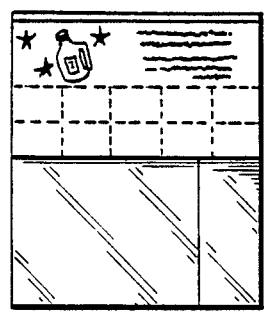
FIG. 21 is a side view of a folded bag assembly in accordance with the invention partially folded and including parts A and B shown in FIG. 18, but before the addition of part C. The part A of FIG. 18 has been replaced by a variation of the improved embodiment shown in FIG. 20.

FIG. 21 shows the bag section B of FIG. 18b partially folded about the cardboard insert A of FIG. 18a. The cardboard insert is shown in FIG. 21 as being a type of insert upon which advertising or discount coupons have been imprinted as shown in FIG. 20. The arrangement, however, is partially coupons and partially general advertising material.

Figure 22:
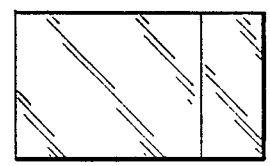
FIG. 22 is a top or side view of the folded bag assembly of FIG. 21 completed with the addition of the outer shrink wrap coating of part C of FIG. 18.
Figure 23A:
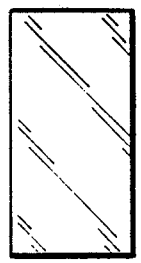
FIG. 23 shows an example of four different sized and color coded bags denoted as separate FIGS. 23a, b,c and d preparatory to assembly into a bag assembly in accordance with the broad aspects of the present invention.
Figure 23B:
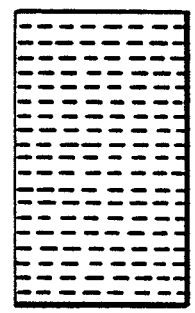
Figure 23C:
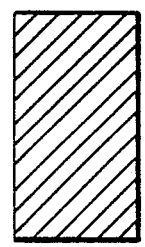
Figure 23D:
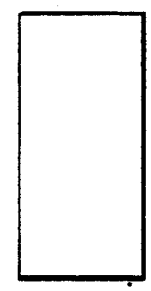

FIG. 22 shows the bag assembly, shown disassembled in FIGS. 18a, 18b and 18c assembled together. One of the folding seams of the bags which constitutes section B of the bag assembly can be seen.

FIGS. 23a, 23b, 23c and 23d show the component bags of a four-bag assembly in which the various bags are of different dimensions both as to width and height. As can be seen, the largest bag of the four is bag B in FIG. 23b. The bags are also color coded. For example, bag A may be clear for clear glass, bag B may be gray for aluminum cans, bag C may be brown or greenish black for reclaimable plastic, and bag D may be white for newsprint. Bag A may be the thickest at about 3 mills, while Bag C may be comprised of the thinnest plastic at about 1.5 mils for plastic scrap which is usually light and most of which usually is comprised of thin plastic sheet material such as bags and wrappings.

Figure 24:
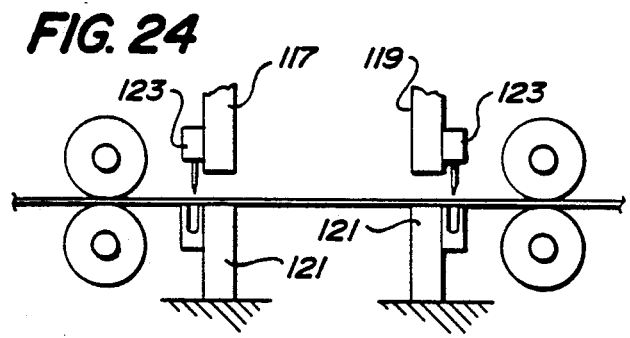
FIG. 24 shows a diagrammatic side view of a portion of an alternative assembly apparatus for assembling the bag assemblies of the present invention where both the top and the bottom of the bags is heat tacked to hold the assembly together.

FIG. 24 shows an alternative apparatus somewhat similar to the apparatus shown in FIGS. 1 and 2, but in which the bag assemblies 45 may be heat tacked at both ends at the same time. This is accomplished by having two heating dies 117 and 119, each opposed to an anvil 121 and each carrying with it a cutting head 123 for severing the bag sections immediately upon tacking.

Figure 25:
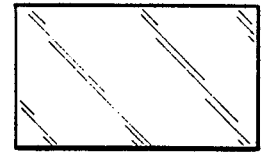
FIG. 25 shows the exterior of a bag assembly made using the apparatus of FIG. 24, but after subsequent folding.

FIG. 25 shows from the side a bag assembly made in the apparatus of FIG. 24.

Figure 26:
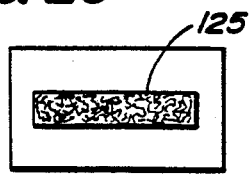
FIG. 26 shows the exterior of a folded bag assembly in accordance with the present invention including a roughened central portion designed to alleviate sliding of the bag assembly from papers into which it is inserted due to any slipperiness of the plastic on the exterior of the bag assembly.

FIG. 26 shows a side view of a bag assembly such as shown in FIG. 25 in which a portion 125 of the outer covering is roughened to provide a certain amount of interaction with the surfaces of the newspapers to prevent a smooth and slippery plastic bag material from ejecting itself from a newspaper into which it is stuffed when pressure is applied to the paper.

Figure 27:
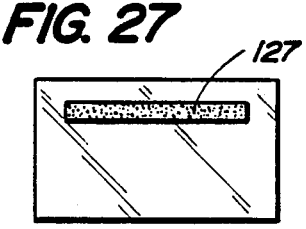
FIG. 27 shows an alternative exterior of the bag assembly in which a strip of slightly adhesive material is provided on one or both sides of the bag assembly to prevent excessive sliding within a paper into which it may be inserted.

FIG. 27 shows a further alternative to the bag assembly shown in FIG. 26 in which alternative version the outer surface of the bag assembly is provided with a semi-sticky or adhesive portion 127 which will adhere lightly to adjacent newspaper material to prevent ejection of the bag assembly from said newspaper material, particularly under pressure from stacked newspapers. It will be understood that a type of modern adhesive having limited and easily overcome adhesive qualities which will likewise not deface or destroy the surface of the papers is very desirably used.

FIG. 28 is a diagrammatic flow sheet of the overall recycling sequence and procedure when practiced using the method and assemblies of the present invention. In FIG. 28, a series of four bag materials 129 are brought together as shown by the arrows 131 between an anvil 133 and a heating head 135, which, as explained above, served to tack the ends of the bag assemblies together. The resulting bag assemblies are then inserted by a stuffing apparatus 137 in newspapers 139 and are conveyed by truck 141 and newscarriers 143 to residences 145 where the component bags of the bag assemblies are separated into separate open bags 148 into which selected or separated solid waste is deposited. The bags are then secured to form bundles 149 of reclaimable materials and are set out before residences 145 for collection by a truck 151 which carries the bagged reclaimables to a collection center where the bags 149 are opened and their contents dumped into large containers for receiving identified reclaimables. It will be noticed that one of the containers 153 has the bags themselves conveyed into it as scrap or recyclible material. In this manner the recycling bags themselves are recycled and do not add to the burden on municipal waste facilities. The containers 153 are then conveyed as appropriate to reclamation industries 155, each of which may reprocess one or several of the reclaimable materials.

FIG. 29 is a diagrammatic side view of the component bags of a five bag assembly in accordance with the present invention. It may be seen in the various figures of overall FIG. 29 that the various bags, while generally of the same width, may be of different lengths. Advertising material is also shown on the faces of the various bags.

The easy adaptability of the invention to the widespread promotion of products and processes, that is to say as an advertising medium, is one of its very considerable advantages. Not only can the sides of the color coded bags be used as advertising space, as seen in FIG. 29a through 29e, but in the embodiments of the invention in which a wrapping form is used, the wrapping form can contain advertising and as shown in the drawings, can be made in the form of detachable tickets or coupons and the like. Since the color coded bags will usually be placed in an open condition in a residence for a week or so at a time, usually in a visible location, the exposure of any ads on the surface will be proportionately greater than for other stuffer-type advertising inserts and should command a premium price for advertising space. In many cases, therefore, the revenue obtained from sale of advertising space will be sufficient to largely, if not completely, cover the cost of distributing, and in many cases, the material cost of the assemblies themselves, making the use of the system of the invention even more attractive to both municipal governing bodies and the ultimate consumers than would otherwise be the case.

FIG. 30 shows the component bags of a bag assembly in accordance with the present invention in which there are three different length bags. The individual bags are, in addition to color coding, marked with appropriate legends as to their intended contents.

FIG. 31 shows a bag assembly, in accordance with the present invention, in which the component bags, after being folded over a central reinforcing strip of cardboard or other flexible material such as shown in previous figures, are then clipped or tied to the central reinforcing material by narrow plastic or other tapes 157 in place of the shrink wrap outer covering shown in, for example, FIGS. 22 and 25.

Figure 32:
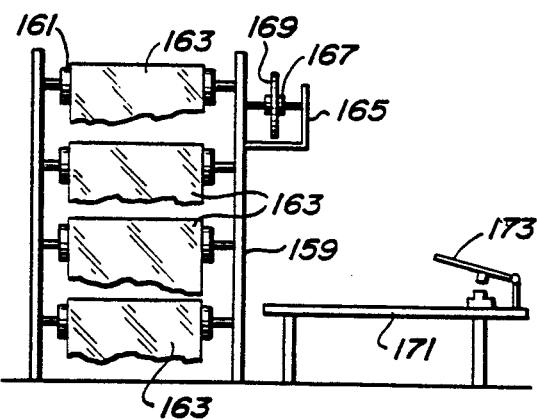
FIG. 32 shows a diagrammatic side elevation of an assemblage of equipment forming a work station for manual formation of bag assemblies in accordance with the present invention.

FIG. 32 shows an apparatus arrangement for manually producing bag assemblies in accordance with the present invention. In FIG. 32 there is shown a rack 159 upon which are rotatably journaled reels 161 having wrapped thereabout plastic sheet material 163 of various widths. An offset section 165 on the rack 159 contains a small reel 167 upon which may be wrapped plastic reinforcing strips 169 such as shown in FIGS. 2 and 2A. Beside the rack 159 is a work table 171 having a manual heat press 173 at one end. It will be understood that when manually making up a bag assembly in accordance with the present invention a manual worker, not shown, may draw plastic bag materials 163 from the reels 161 stacking such bag materials one upon the other on the surface of the table 171. A short section of the plastic strip 169 will then be laid along the bottom of the bag materials and the entire end of the assembly including the plastic reinforcing strip 169 will be placed on the manual heat press 173 and gently tacked together by heat. The bag assemblies 175 may then be folded upon themselves once upon the table 171 after which they are ready for insertion in news sheets.

Figure 33:
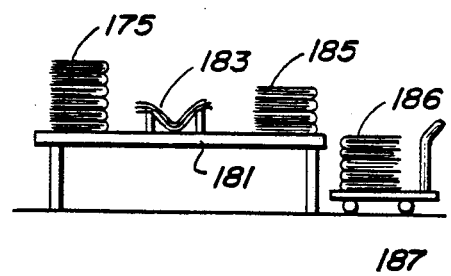
FIG. 33 shows a diagrammatic side elevation of an assemblage of equipment for manual insertion or stuffing of bag assemblages in accordance with the present invention into newspapers prior to delivery with such papers.

The bag assemblies 175, made in accordance with the above explained procedure, with reference to the manual forming station shown in FIG. 32, may be inserted into newspapers on the working table 181 shown in FIG. 33. Working table 181 incorporates a V-type rack 183 upon the surface on which newspapers 185 may be opened, after which the plastic bag assemblies 175 are placed within the papers and the papers are closed and stacked upon a hand cart 187 for removal from the working area for subsequent distribution to consumers in accordance with the general flow sheet scheme shown in FIG. 28. The assembled papers and inserts 175 and 185 are denoted 186 in FIG. 33. It will be understood that many other arrangements for manually making the bag assemblies and/or inserting or stuffing such bag assemblies in a newspaper or other periodical could be used. For example, the insertions of the bag assemblies into the newspapers could even be done by a newsboy prior to delivery of the papers.

It will also be recognized that the bag assemblies of the invention made for insertion into news media can also be otherwise distributed to the public for use in recycling. For example, such bag assemblies might be separately delivered by newsboys or others or could even be mailed, distributed directly to householders from a central distribution point or otherwise provided to the public. Such alternative distribution schemes are generally not as desirable as distribution in accordance with the invention together with newspapers, however.

Figure 34A:
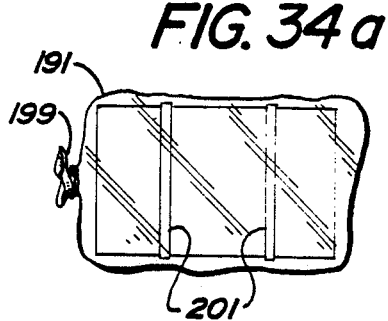
FIGS. 34a, 34b and 34c show diagrammatically an alternative embodiment of the invention in which different sections of a newspaper are initially contained in a series of color coded bags for delivery.
Figure 34B:
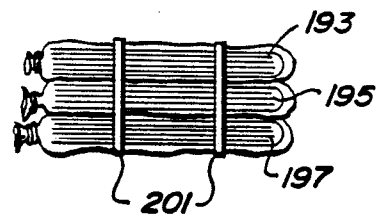
Figure 34C:
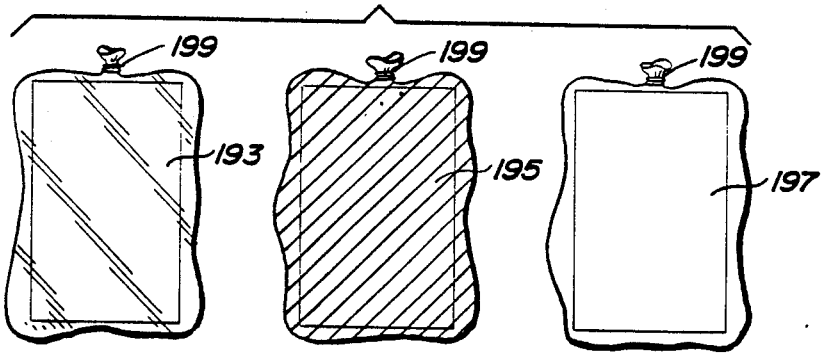
Figure 35:
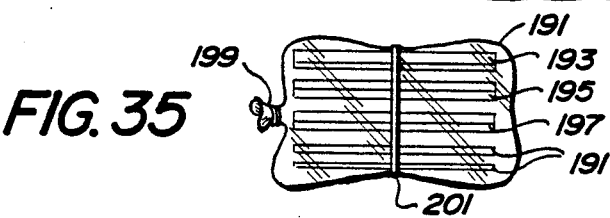
FIG. 35 shows diagrammatically a still further embodiment of the invention in which a single plastic bag contains various sections of a newspaper plus other color coded bags for initial protection of the papers from the elements followed by the later use of the color coded bags for recyclable solid waste materials.

FIGS. 34a, 34b and 34c show respectively a top view, a side view and an expanded view of an alternative embodiment of the invention in which color coded plastic bags 191 are initially used to contain separate sections 193, 195, 197 of a voluminous newspaper such as the usual Sunday papers. Each bag is secured with a tie 199. The paper sections are thereby protected from the weather when delivered and the color coded bags after removal of the paper sections can then be used for recycling as explained above. The color coded bags containing the separate sections of papers can be secured together by external ties such as plastic straps 201. The three illustrated separate paper bag assemblies are shown separately laid out in FIG. 34c. Alternatively, one of the bags can be used to contain the others plus the papers as shown in FIG. 35 in slightly expanded form, in which case it will be understood the assemblage still constitutes an assembly of bags. As a still further alternative, different color coded bags can be used on consecutive or otherwise succeeding days to contain the daily papers so that over a given period each person receiving a paper will receive the required number of color coded bags or containers for a week's supply. Such an arrangement or schedule may be difficult to coordinate with recyclable products collection schedules, however.

It will be recognized from the above description and appended drawings that the present invention provides a very efficient and satisfactory manner for providing convenient assemblages of color coded bags for collection of various solid waste materials prior to recycling. The method and apparatus of the invention is particularly efficient and satisfactory since it can be almost universally applied or used with very limited expense to the ultimate residential users. Where significant residences in an area do not receive regular delivery of newspapers, subsidiary means can be adapted for supply of the necessary color coded bags to those residences not receiving papers. It may be noted, however, that in several towns and parts of the nation at the present time abbreviated summary versions of the daily local papers are delivered to all households once a week without charge for their advertising content. Obviously, where such is true, the color coded bag assemblies of the present invention can be delivered to all residences along with such universally delivered abbreviated news sources.

While it has been assumed in the present application that the flexible containers from which the bag assemblies or container assemblies of the present invention are formed are the usual plastic bag materials, it will be understood they could be formed of other suitable materials such as, for example, some of the modern biodegradable plastic materials or other materials based upon cellulose type materials.

As used herein and in the appended claims, the following terms have the listed meanings:

(a) "flexible container" refers to a plastic bag or other container which can be folded into a substantially flat space-saving configuration, (b) "stuffer" refers to an advertising folder or the like adapted for insertion into daily, weekly or other newspapers or other regularly delivered printed materials, (c) "newsprint medium or media" refers to newspapers, magazines and other regularly delivered printed materials, (d) "stuffing machine" refers to a physical or mechanical arrangement including mechanical means to insert stuffers into newsprint medium, (e) "post consumer material" refers to any product generated by a business or consumer that has served its intended end use and is normally now ready for discard or disposal, (f) "source-separated recyclable materials" refers to materials that are separated from a waste stream at the point of origin for the purpose of recycling or the like, (g) "indicia coded" refers to flexible container means such as plastic bags or the like provided with external easily visible markings or coloring such as color coding but not excluding other prominent indicia that effectively serves to distinguish to the observer one such container means or its intended use or contents from others, (h) "resource recovery center" refers to a plant or industry that recovers reusable materials by remelting or fusing, reconditioning and/or separation, recovers fuel value from such materials by combustion or converts material into fuel substances or otherwise recovers useful materials or energy from post consumer material, (i) "building units" means residences, businesses, apartments and any other building or associated groups to which regular paper delivery may reasonably be made, (j) "targeted areas" means predetermined geographical areas selected for distribution therein of certain goods or items.

While the present invention has been described at some length and with some particularity with respect to several described embodiments, it is not intended that it be limited to any such particulars or embodiments or any particular embodiment, but is to be construed broadly with reference to the appended claims so as to provide the broadest possible interpretation of such claims in view of the prior art and therefore to effectively encompass the intended scope of the invention.

I claim:

1. A method for separating solid post-consumer waste materials into source-separated recyclable materials comprising:
   (a) providing a plurality of multiple indicia coded flat expansible flexible container means, each expansible flexible container being coded for receipt therein of a predetermined category of waste-materials,
   (b) periodically physically associating at least one of said flexible container means with each of at least a substantial number of newsprint media to be delivered to building units within targeted areas in a political subdivision,
   (c) delivering said physically associated container means to said building units with said newsprint media,
   (d) collecting said flexible containers after they have had placed within them source separated recyclable materials appropriate to the indicia provided on the containers, and
   (e) delivering similarly indicia coded groups of said containers to appropriate recycling facilities in accordance with the indicia of said containers for processing.

2. A method for recycling in accordance with claim 1 wherein the indicia code of the flexible containers is a color code on the surface of the flexible containers for their contents and the color coded flexible containers are delivered via regular news media distribution on a schedule in accordance with local requirements for a supply of containers for solid waste disposal.

3. A method for recycling in accordance with claim 2 wherein the flexible containers include written instructions on their exterior identifying the type of recyclable waste to be inserted into the respective color coded container upon which the color coding and instructions appear.

4. A method for recycling in accordance with claim 3 in which the color coded containers are picked up after having recyclables placed within them on a schedule dependent at least in part on the color coding on the exterior of the containers.

5. A method for recycling in accordance with claim 4 wherein the color coded containers are physically stuffed individually in newspapers prior to delivery with said news papers in the targeted area.

6. A method for recycling in accordance with claim 4 wherein the newsprint media are delivered in the color coded containers to temporarily protect such newsprint media from adverse weather and other conditions and the containers are subsequently used for on-site presorting of household waste material.

7. A method of providing a means for facilitating solid waste recycling comprising:
   (a) assembling a plurality of individually different color-coded flexible containers into a unitary flexible container assembly,
   (b) securing the individual flexible containers together to maintain the substantial integrity of the container assembly during delivery to its point of use and until used for containing recyclable materials.
   (c) the individual color coding of the containers being such as to aid in identifying the containers into which particular post-consumer materials are to be deposited for subsequent transport at least part way to resource recovery center, and
   (d) adding a stiffening means to the container assembly to fascilitate handling by a stuffing mechanism.

8. A method in accordance with claim 7 additionally comprising:
   (c) folding the flexible container assembly upon itself to reduce its overall dimensions to the dimensions of a compact bundle which may be conventionally stuffed into a folded newspaper.

9. A method in accordance with claim 7 wherein the individual flexible containers assembled together are not of uniform size.

10. A method in accordance with claim 9 wherein the individual flexible containers assembled together are not of uniform wall thickness.

11. A method in accordance with claim 8 additionally comprising:
    (d) stuffing the folded flexible container assembly into a newsprint medium.

12. A method in accordance with claim 11 wherein the individual flexible containers are formed of plastic and are secured together by heat tacking of the plastic material.

13. A method in accordance with claim 11 wherein the individual flexible containers are secured together by external tie means.

14. A method in accordance with claim 11 wherein the individual flexible containers are secured together by a clip-type securing means.

15. A recycling container package assembly adapted for regular delivery to building units as a part of a news media package comprising:
    (a) a plurality of substantially flat flexible container means,
    (b) such flexible container means being individually color coded to distinguish one from another, and to code for recyclable materials to be placed therein, (c) securing means to detachably secure together said flexible container means in a substantially side-by-side flat orientation with adjacent flexible container means, (d) a stiffening means associated with the container package for interaction with a stuffing mechanism to enable the package to be stuffed into a newsprint medium.

16. A recycling container package assembly in accordance with claim 15 wherein the plurality of flexible container means are of at least two different individual sizes.

17. A recycling container package assembly in accordance with claim 16 wherein the plurality of flexible container means are formed from flat structural materials of at least two wall gauges or thickness.

18. A recycling container package assembly in accordance with claim 16 wherein the stiffening means comprises:

(e) a flat material attached to the flexible container package assembly at least at one end to reinforce the assembly and allow its expeditious handling by new media stuffing machinery.

19. A recycling container package assembly in accordance with claim 17 additionally comprising:

(e) a flat material attached to the flexible container package assembly at least at one end to reinforce said assembly and expedite its efficient handling by news media stuffing machinery.

20. A recycling container package assembly according to claim 18 wherein the plurality of individual flexible container means forming the assembly are folded upon themselves to form a compact bundle conveniently stuffable into a newsprint medium into which they are intended to be inserted.

21. A recycling container package assembly according to claim 19 wherein the plurality of individual flexible container means forming the assembly are folded upon themselves to form a compact bundle conveniently stuffable into a newsprint medium in which they are intended to be inserted.

22. A method of providing a means for facilitating solid waste recycling comprising:

(a) assembling a plurality of individually different indicia coded flexible containers into a unitary flexible container assembly, (b) securing the individual flexible containers together to maintain the substantial integrity of the container assembly during delivery to its point of use and until used for containing recyclable materials, (c) the individual indicia coding of the containers being such as to aid in identifying the containers into which particular post-consumer materials are to be deposited for subsequent transport at least part way to a resource recovery center, and (d) adding a stiffening means to the container assembly to facilitate handling by a stuffing mechanism.

23. A recycling container package assembly adapted for regular delivery to building units as a part of a news media package comprising:

(a) a plurality of substantially flat flexible container means, (b) such flexible container means being individually indicia coded to distinguish one from another, and to code for recyclable materials to be placed therein, (c) securing means to detachably secure together said flexible container means in a substantially side-by-side flat orientation with adjacent flexible container means, (d) a stiffening means associated with the container package for interaction with a stuffing mechanism to enable the package to be stuffed into a newsprint medium.

* * * * *